H. SYNCK.
FEEDING MECHANISM.
APPLICATION FILED MAR. 1, 1919.
1,320,657.
Patented Nov. 4, 1919.
2 SHEETS—SHEET 1.
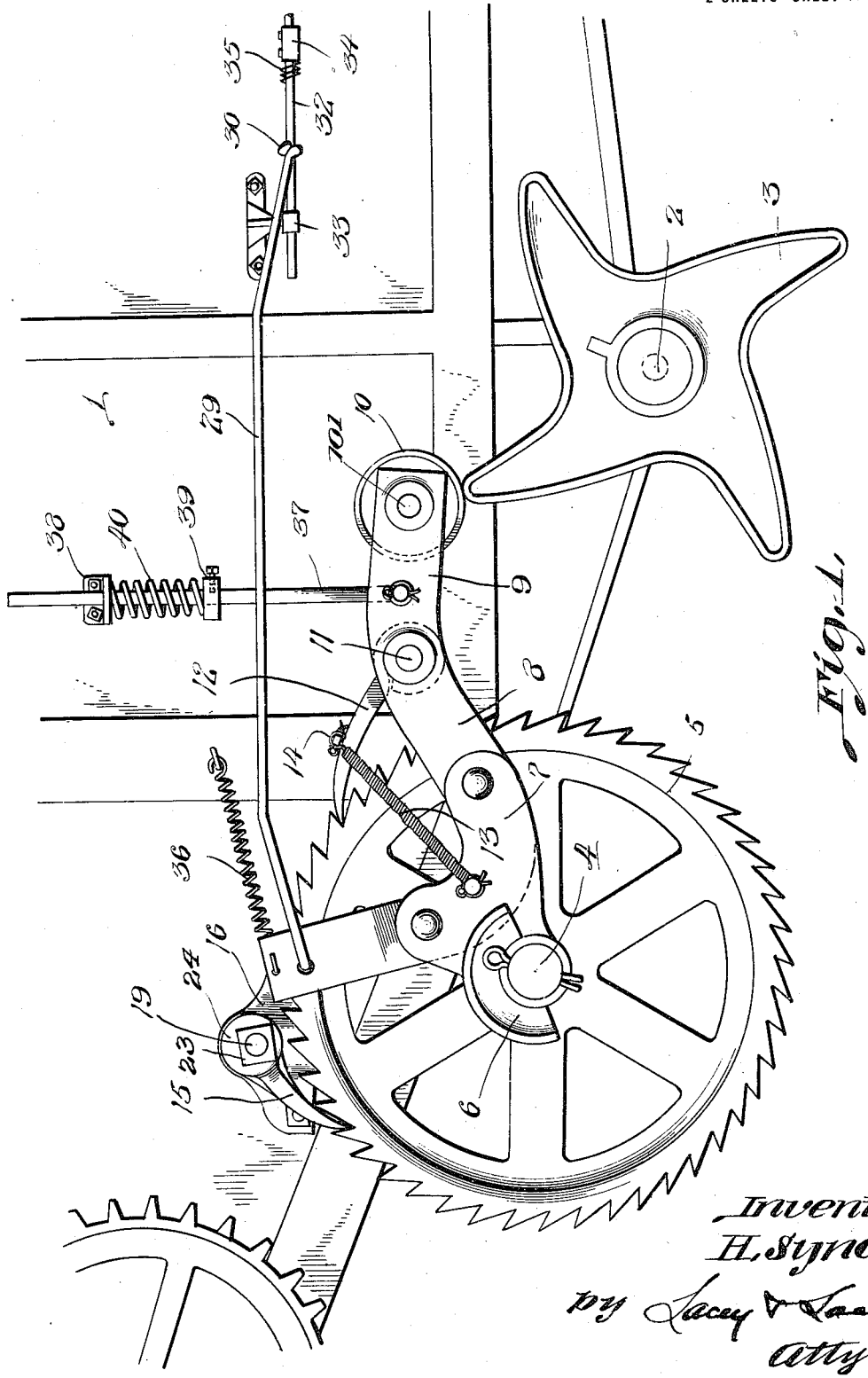

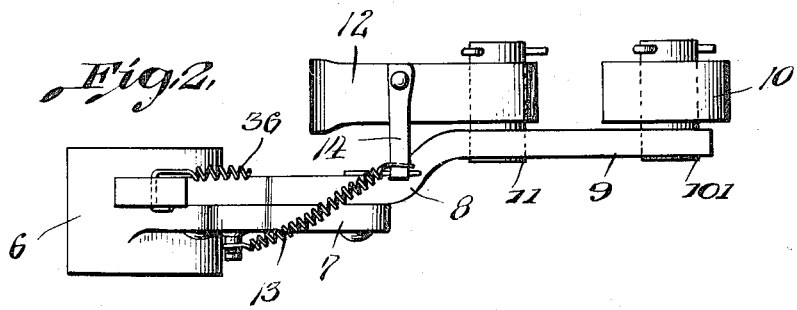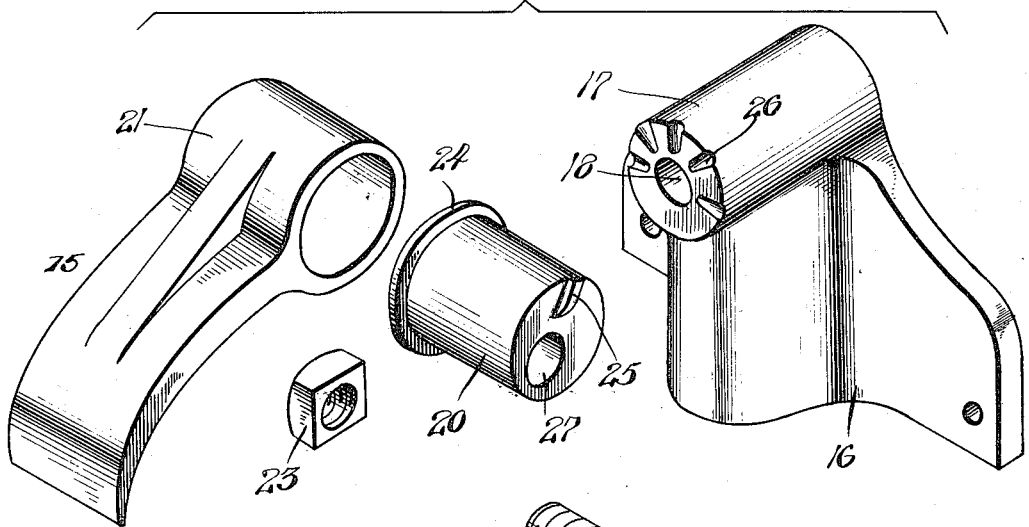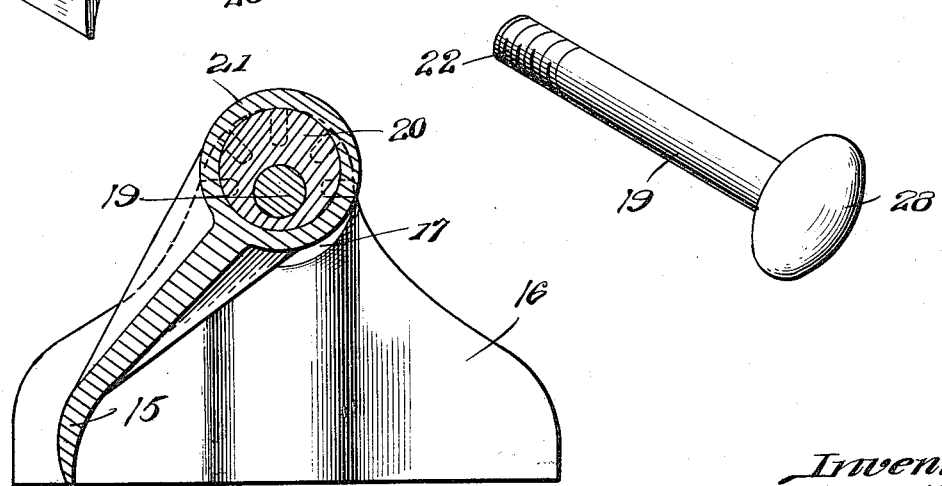

UNITED STATES PATENT OFFICE.

HENRY SYNCK, OF COLDWATER, OHIO, ASSIGNOR TO NEW IDEA SPREADER CO., OF COLDWATER, OHIO.

FEEDING MECHANISM.

1,320,657.　　　　　Specification of Letters Patent.　　Patented Nov. 4, 1919.

Application filed March 1, 1919. Serial No. 280,175.

*To all whom it may concern:*

Be it known that I, HENRY SYNCK, a citizen of the United States, residing at Coldwater, in the county of Mercer and State of Ohio, have invented certain new and useful Improvements in Feeding Mechanisms, of which the following is a specification.

This invention relates to feeding mechanism for fertilizer distributers and has special reference to the feeding mechanism of the type shown in an application filed by myself and Bruce B. Rollman, June 4, 1918, Serial No. 238,231. The object of the present invention is to permit the use of a wider roller to engage the driving cam; to avoid impact of the driving cam against the rocker or oscillatory lever, and to provide a mounting for the holding pawl or dog which may be adjusted so that the said dog will positively hold the ratchet wheel against any and all backward movement. These several stated objects and other objects which will incidentally appear in the course of the following description are attained in the mechanism illustrated in the accompanying drawings and the invention resides in certain novel features which will be hereinafter first fully described and then particularly pointed out in the appended claims.

In the drawings:

Figure 1 is a side elevation of a feeding mechanism embodying my present improvements;

Fig. 2 is a plan view of the feeding pawl with the rocker or oscillatory lever and the parts immediately associated therewith.

Fig. 3 is a group perspective view of the holding pawl or dog and the mounting for the same;

Fig. 4 is a section taken longitudinally through the holding dog and showing the manner of mounting the same.

In the drawings, the reference numeral 1 indicates a portion of the frame or bed of a fertilizer distributer, and 2 indicates the rear axle mounted thereon in the usual manner. A driving cam 3 is secured rigidly to the axle 2 and in the present instance is shown as constructed with four arms each having its forward face approximately radial to the axle and its rear face eccentric to the axle and convexly curved. Supported at the rear end of the bed 1 in the usual manner is a shaft 4 on which are secured sprocket wheels carrying the apron by which the fertilizer is conveyed to the distributing and spreading devices, these sprocket wheels and the conveyer not being illustrated, however, as they form no part of my present invention. A ratchet wheel 5 is secured upon the shaft 4 and is intermittently rotated so as to impart rotary movement to the shaft 4 and thereby actuate the conveyer so as to effect travel of the same toward the rear of the bed 1 and accomplish the desired delivery of the fertilizer. The means for rotating the ratchet wheel comprises a casting 6 which is mounted loosely upon the shaft 4 and is provided with an arcuate extension 7 to which the rocker or oscillatory lever 8 is rigidly secured, the said rocker or lever being illustrated as an angle lever having one arm projecting upwardly and disposed above the shaft 4 while the other arm projects forwardly from the said shaft. The forwardly projecting arm of the rocker is curved, as shown, so that it rises from the end of the extension 7 of the bracket 6 in the position shown in Fig. 1 and then is carried forward as at 9 having the form substantially of a shallow inverted V. At the extremity of the rocker is a stud 10¹ and a roller 10 is mounted thereon for free rotation and disposed in the vertical plane of the driving cam 3 so that it will be engaged by the arms of the said cam as the latter rotates. At the apex of the V-shaped portion of the rocker, I pivotally attach by a pin 11 the feeding pawl 12 which projects rearwardly and engages the teeth of the ratchet wheel 5 so that as the arm 8 of the rocker moves upwardly and rearwardly under the influence of the driving cam 3 the ratchet wheel will be rotated and a feeding impulse transmitted to the fertilizer conveyer. Of course, as the roller 10 clears the end of the arm of the cam 3 the feeding pawl will move reversely over the ratchet wheel and return to its initial position. To hold the pawl in engagement with the ratchet wheel, I provide a spring 13 which is secured at one end to a projection or finger 14 on the pawl and at its opposite end to the extension 7 of the bracket 6.

To prevent retrograde movement of the ratchet wheel, a holding dog or pawl 15 is provided and this holding dog or pawl is usually mounted upon the wagon bed immediately over the ratchet wheel. It has been found that there is a considerable variance in the detailed proportions in frames of fertilizer distributers so that the relation of the driving cam to the rocker and the holding dog is not always exactly the same and it is not always possible to mount the holding dog in exactly the same position relative to the ratchet wheel so that the holding dog does not engage the teeth of the ratchet wheel properly and will permit the ratchet wheel to slip back various distances sometimes equal to the distance between two successive teeth so that the feeding of the fertilizer is irregular. I have overcome this objection by the means shown more particularly in Figs. 3 and 4. A base 16 is secured to the side of the bed 1 adjacent the upper edge of the ratchet wheel and this base is provided at its upper end or edge with a substantially cylindrical boss 17 having a central bore 18 to receive the pin 19 constituting the pivot or axle for an eccentric 20. The holding dog 15 is constructed with a hub 21 which encircles the eccentric 20 and the outer extremity of the pin 19 is threaded, as shown at 22, to receive a securing nut 23. One end of the eccentric 20 is provided with an annular shoulder or head 24 to engage against the outer end of the hub 21 while the inner end of the eccentric is provided with a radial tooth or lug 25 adapted to engage in any one of a plurality of radial notches 26 formed in the outer end of the boss 17. It will, of course, be understood that the eccentric 20 has a bore 27 extending entirely through the same to receive the pin 19. In assembling the parts, the pin 19 is inserted through the bore 18 of the boss 17 with its head 28 bearing against the inner end of the boss after which the base 16 is secured to the side of the wagon bed. The eccentric is then fitted in the hub 22 and the dog and eccentric then mounted on the projecting portion of the pin 19. The eccentric is rotated within the hub and about the pivot pin until the lug 25 engages the proper one of the notches 26 after which the nut 23 is turned home. The dog may rotate or swing freely upon the eccentric and it will be readily understood that by shifting the eccentric about the pin 19 the hub of the dog will be raised or lowered or moved forwardly or backwardly and, consequently, the free end of the dog may be readily adjusted so as to properly and positively engage the ratchet wheel and prevent all retrograde movement thereof. It is, of course, to be understood that after the eccentric has been once adjusted readjustment thereof will not be necessary unless some of the parts should be badly worn through long continued use.

It is desirable in feeding mechanism of this type that all unnecessary noise be eliminated and also that the roller 10 be in engagement with the driving cam for the full length of its stroke. To regulate the stroke of the rocker, I pivotally attach to the upper end of the same a sleeve member 29 which extends forwardly and has its extremity 30 slidably receiving the rear portion of a controlling rod 32 which is slidably mounted in a suitable guide 33 on the side of the wagon bed and extends forwardly to the front end thereof where it may be set by the driver through the medium of an ordinary hand lever in a well-known manner. An adjustable stop 34 is secured upon this rod 32 and it is obvious that by moving the said stop forwardly or rearwardly the length of the stroke may be governed inasmuch as the eye or sleeve 30 will impinge against said stop in its forward movement. By moving the rod 32 rearwardly, the stop 34 may be set to hold the rocker out of the path of the cam and thereby arrest the operation of the feeding mechanism so that the machine may be moved from one field to another field without distributing. To prevent breakage of the parts, a cushion spring 35 is coiled around the rod 32 immediately adjacent the stop 34 so as to receive the impact of the member 30. In Fig. 1, I have shown a retractile spring 36 secured at its rear end to the upper extremity of the rocker and at its forward end to the side of the wagon bed and it will be readily understood that when the rocker is oscillated the spring 36 will be alternately extended and retracted so as to hold the roller 10 constantly in engagement with the working face of the cam 3. I have also shown a vertically disposed pin or rod 37 pivoted at its lower end to the forwardly projecting portion of the rocker between the feeding pawl and the roller 10 and having its upper portion slidably mounted in a bracket or guide 38 on the side of the wagon bed. An adjustable collar 39 is secured upon the rod 37 and a spring 40 is coiled around said rod between the guide 38 and the collar 39. When the forward free end of the rocker is raised under the influence of the cam, the spring 40 will be compressed and by its tendency to expand will hold the roller 10 constantly against the working face of the cam and as the roller clears the end or point of the arm of the cam will cause the roller to ride down the rear face of said arm. While I have shown these springs 36 and 40 as both connected to the rocker, it is to be understood that either spring may be omitted and the spring retained will effectually operate to hold the roller 10 against the driving cam so that it will ride on the rear convex face of the working arm of the cam and not drop forcibly with a distracting noise or jar against the advancing working face of an arm of the cam. By applying the holding force vertically downward upon the rocker, I obtain a direct action which effectually holds the end of the rocker to the cam. By providing separate pivot points for the roller and feeding pawl, I am enabled to use a wider roller than if the pawl and roller had a common pivot and by giving the forwardly extending arm of the rocker the inverted shallow V-shape shown and described, I obtain decided advantages in operation. Where the impulse-receiving arm of the rocker was straight as heretofore generally constructed, it frequently assumed a position while at work in which the tappet or cam arm would hit the under edge of the rocker in rear of the end thereof instead of engaging the roller or the end of the rocker so that distracting noise and excessive wear of the parts resulted, but I overcome this noise and wear by forming the intermediate portion of the rocker arm above a straight line connecting the ends of the arm.

My present invention is very simple in the construction and arrangement of its parts and possesses a high degree of efficiency for the purpose for which it is designed.

Having thus described the invention, what is claimed as new is:

1. In a feeding mechanism for the purpose set forth, the combination of a rotatable feeding element, means for intermittently actuating said element, means for holding said element against retrograde movement, and means for adjusting said holding means circumferentially of the rotatable feeding element.

2. In feeding mechanism for the purpose set forth, the combination of a rotatable feeding element, a holding device disposed adjacent the said element to engage the same and prevent backward rotation thereof, and an adjustable eccentric mounting for said holding device.

3. In feeding mechanism for the purpose set forth, the combination of a ratchet wheel, means for intermittently rotating said wheel, a base disposed adjacent said ratchet wheel, a pivot carried by said base, an eccentric fitted on said pivot and rotatable about the same, and a holding dog pivotally mounted on said eccentric and arranged to engage the ratchet wheel.

4. In feeding mechanism for the purpose set forth, the combination of a ratchet wheel, means for intermittently rotating the same, a base disposed adjacent the ratchet wheel and provided with a boss having a plurality of radial notches in one end, a pivot pin inserted through said boss, an eccentric rotatably fitted on said pin and provided at one end with a lug to engage one of the notches in the boss, a pawl having a hub mounted on said eccentric to swing around the same, and means on the pivot pin to secure said eccentric against the boss.

In testimony whereof I affix my signature.

HENRY SYNCK. [L. S.]